(12) United States Patent
Clark

(10) Patent No.: US 8,777,294 B2
(45) Date of Patent: Jul. 15, 2014

(54) DEVICE FOR COVER SUPPORT

(76) Inventor: David William Clark, Marion, IL (US)

( * ) Notice: Subject to any disclaimer, the term of this patent is extended or adjusted under 35 U.S.C. 154(b) by 78 days.

(21) Appl. No.: 13/288,468

(22) Filed: Nov. 3, 2011

(65) Prior Publication Data
US 2013/0112232 A1  May 9, 2013

(51) Int. Cl.
*B60P 7/04* (2006.01)
*B60J 7/10* (2006.01)
*B60P 7/02* (2006.01)

(52) U.S. Cl.
CPC *B60J 7/104* (2013.01); *B60J 7/102* (2013.01); *B60P 7/04* (2013.01); *B60P 7/02* (2013.01)
USPC .......................................................... 296/102

(58) Field of Classification Search
USPC ................ 52/53, 64, 65, 69, 653.2; 105/377.01–377.05; 135/88.09, 122, 135/124, 125, 128, 136, 151, 152, 153; 160/65, 72, 73, 77, 81; 220/1.5; 296/98, 100.01, 100.11, 100.14, 296/100.17, 100.18, 101, 102, 104, 105, 296/118
See application file for complete search history.

(56) References Cited

U.S. PATENT DOCUMENTS

| | | | | |
|---|---|---|---|---|
| 632,578 | A * | 9/1899 | Loenard | 296/100.18 |
| 722,873 | A * | 3/1903 | Mutch | 105/377.02 |
| 1,026,899 | A * | 5/1912 | Bettendorf | 105/377.05 |
| 1,221,434 | A * | 4/1917 | Frederick | 105/377.03 |
| 2,166,846 | A * | 7/1939 | McCalley | 414/509 |
| 3,971,590 | A * | 7/1976 | Yglesias | 296/104 |
| 4,248,475 | A | 2/1981 | Johnsen | |
| 4,823,707 | A * | 4/1989 | Salsbury et al. | 105/377.02 |
| 4,854,633 | A * | 8/1989 | Kraft et al. | 296/104 |
| 4,915,439 | A * | 4/1990 | Cramaro | 296/98 |
| 5,487,584 | A | 1/1996 | Jespersen | |
| 5,765,901 | A * | 6/1998 | Wilkens | 296/98 |
| 5,823,067 | A * | 10/1998 | Clarys et al. | 74/546 |
| 5,860,547 | A * | 1/1999 | Cozzolino et al. | 220/1.5 |
| 5,873,210 | A | 2/1999 | Brumleve | |
| 6,361,100 | B1 * | 3/2002 | Koester | 296/100.18 |
| 6,976,433 | B1 | 12/2005 | Neumann | |
| 7,484,789 | B1 | 2/2009 | Aulick | |
| 7,520,558 | B2 * | 4/2009 | Conny et al. | 296/185.1 |
| 7,611,187 | B1 | 11/2009 | Rogers | |
| 7,789,448 | B1 | 9/2010 | Ver Steegh | |
| 7,823,515 | B2 * | 11/2010 | Schaefer et al. | 105/377.02 |
| 2005/0088007 | A1 | 4/2005 | Royer | |

FOREIGN PATENT DOCUMENTS

| | | | | | |
|---|---|---|---|---|---|
| CH | 660712 | A5 * | 6/1987 | | B60J 7/10 |
| DE | 3247093 | A1 * | 6/1984 | | B62D 25/00 |
| DE | 3739160 | C1 * | 3/1989 | | B65D 90/02 |
| FR | 2641814 | A1 * | 7/1990 | | E04H 6/04 |
| FR | 2782039 | A1 * | 2/2000 | | B60P 7/02 |
| JP | 56013229 | A * | 2/1981 | | B60P 7/04 |
| JP | 59008541 | A * | 1/1984 | | B60P 1/28 |
| JP | 09099774 | A * | 4/1997 | | B60P 7/04 |
| JP | 10264717 | A * | 10/1998 | | B60P 7/04 |
| WO | WO 9429141 | A1 * | 12/1994 | | B60P 7/04 |

* cited by examiner

*Primary Examiner* — Glenn Dayoan
*Assistant Examiner* — Paul Chenevert
(74) *Attorney, Agent, or Firm* — Stephen J. Stark; Miller & Martin

(57) ABSTRACT

A device for container cover support with spat, spar shaft, and spar shaft rotation lock. Rotation of the spar shaft along a non-vertical axis located along the outer surface of the container sidewall causes the spar to rotate upward and alternatively to uncover the container.

12 Claims, 6 Drawing Sheets

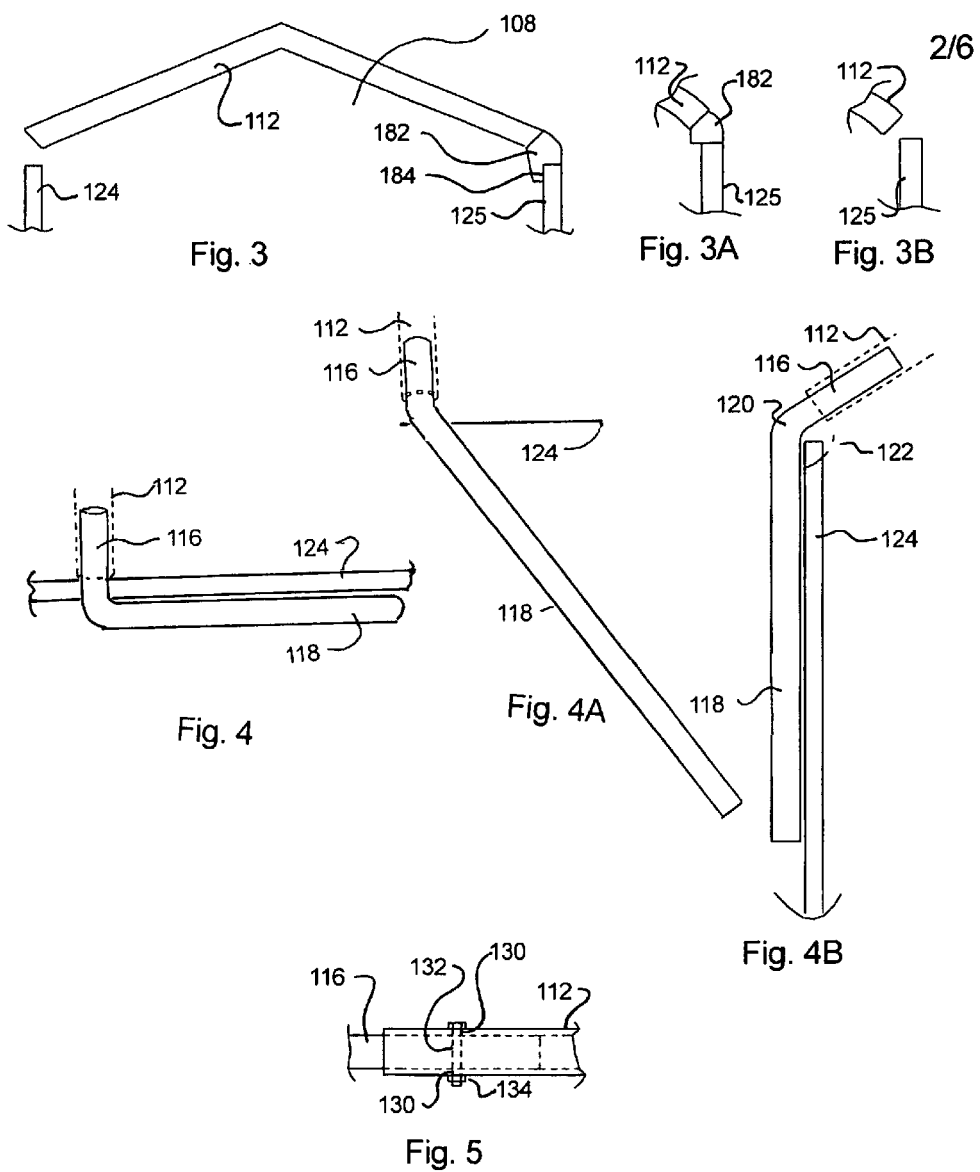

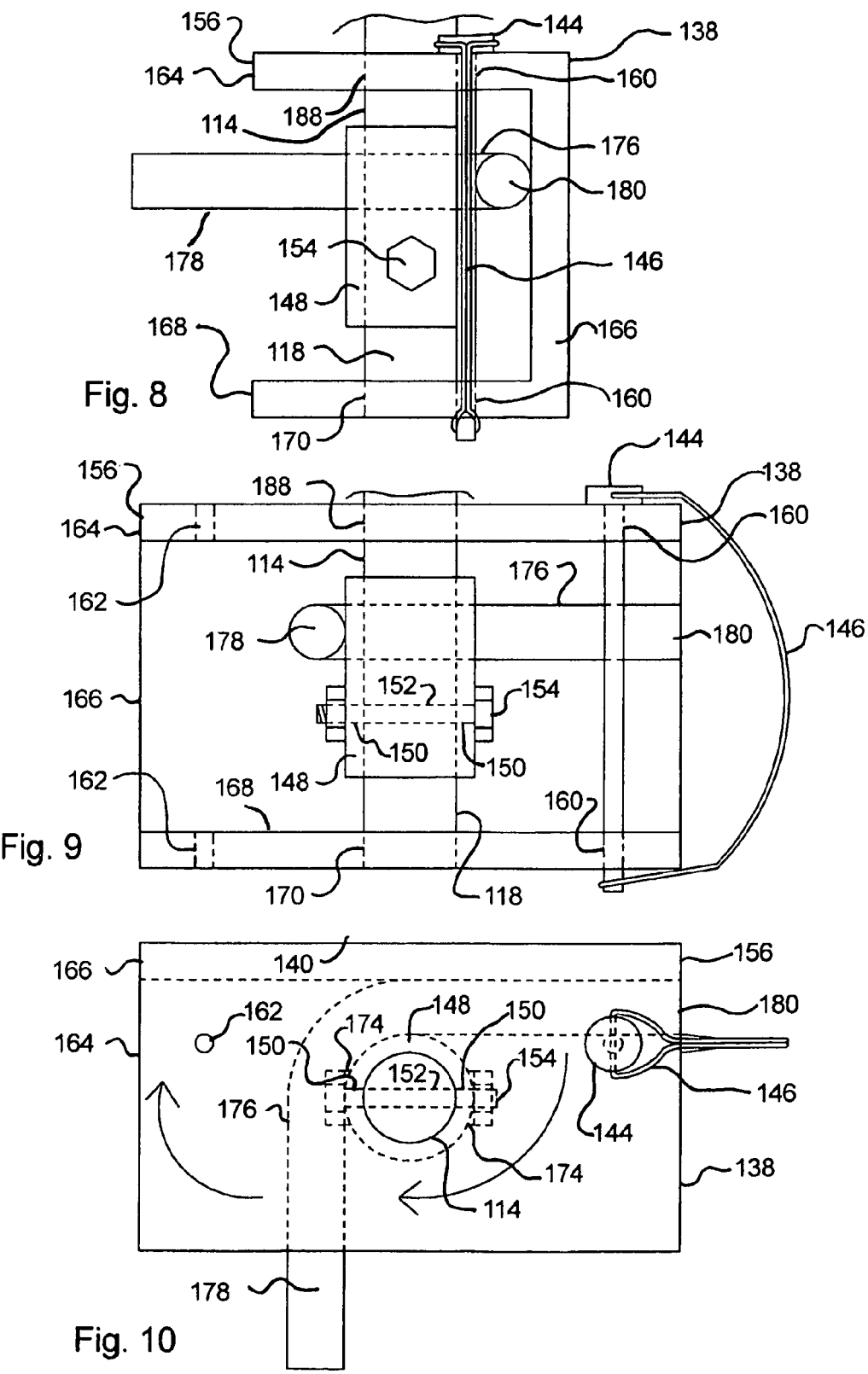

DEVICE FOR COVER SUPPORT

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of cargo transport and more specifically to a device for support of transport container covers.

Open top containers used for transport of sundry types of goods or materials are common. Such containers generally comprise covers removable for loading or unloading and replaceable for transport.

These covers are often made of canvas, or other fabric, or fabric like material used to protect the container contents from the elements and to prevent the escape of contents out of the container. Said covers usually are supported in operative disposition by a framework which spans the open top while communicating with opposite sides thereof.

In example, U.S. Pat. No. 5,487,584 by Jespersen recites a series of parallel bows, each pivotably attached at one end along one side of the opening. The other end reversibly engages the other side of container top opening by means of a locking device. A perpendicular ridge pole is pivotably connected to each bow. This pole assures that all bows move in unison or are in unison prohibited from movement. One bow has a releasable locking mechanism. A pull on a rope releases the lock.

One end of each bow may pivot in a cylindrical hinge mounted oil the inside of the container. Alternately, the end of each bow may extend through the hinge through the floor of the container where a handle may be attached to pivot the bow. Or a bow may extend through the sidewall of the container where a handle, may be attached to pivot the bow. The cylindrical hinge is angled to cause the bow to lift slightly when it is pivoted from locked position.

The location of the Jespersen bow pivot hinges on the inside of the container exposes parts of the device to contact with cargo inside the 'containers. This can foul or damage the device.

Jespersen requires the simultaneous release of the locking mechanism and initiation of pivoting movement. Jespersen requires the bows to swing simultaneously. They can move only in unison. Accordingly, the operator has no choice but to uncover the entire container from front to back. Jespersen additionally requires the operator to visually judge when bows are sufficiently rotated to provide a suitable opening such that loaded cargo will not contact the bows to cause damage to them.

In the Jespersen rope unlocking and pivoting embodiment; the operator must stand away from the trailer in order to minimize abrasion of the rope as it passes over the trailer edge and to achieve sufficient leverage to release the 'lock and to move all bows at once. Also, the Jespersen structure that pivotably connects all bows is unnecessarily complex, comprising swivels and biasing elements to function with precision. When bent slightly or otherwise damaged by normal usage, it becomes difficult to operate and difficult to repair.

In example, the Jespersen bow pivoting operation requires assistance of gravity to complete final stages of a pivot process. The operator is thus not always in full control of bow movement. Also, if any hinges are fouled by exposure to the container contents, the gravity assist function may be hindered and the system rendered inoperable.

In addition, Jespersen requires that an end of the bows comprise an element which must slide into a receiving element mounted on the opposite wall of the container. Thus, the path of the rotating bow' must be precise in order for said communication to be accomplished. Therefore a minimum of bending or distortion of the bows normally expected in the operation of such a cover system would render Jespersen inoperative. This is an inherent characteristic, although the receiving end is configured in such a way as to attempt to counteract it.

In the embodiment comprising an extended rod, the operator must first unlock the bows by means of the rope, secure the rope while maintaining tension to keep the lock open. The operator must then, while maintaining tension on the rope, simultaneously access the rotating handle below the floor of the trailer, which awkward process increases likelihood of injury.

In contrast, the instant art is operable from the ground without the operator having to move significantly away from the container or having to bend over or assume any other vulnerable position.

The instant art does not require a locking device or other receiving structure on an opposite wall to receive and/or lock a bow end.

The instant art does not require a release rope. The instant art does not require all bows to move at once; therefore, limited portions of the container may be opened as required, and less force is required to rotate elements of the cover support structure.

The instant art has no ridge pole or bias elements; therefore, the instant art is more simple and more easily repaired.

The instant art automatically restricts the range of bow rotation between open and closed positions. The instant art does not rely on gravity to assist motion; thus, the movement of the instant art is totally controlled by an operator.

The instant art pivoting and bow support means are never exposed to cargo inside the container.

Thus, the instant art overcomes these several disadvantages of Jespersen.

BRIEF SUMMARY OF THE INVENTION

The primary object of the invention is to create support cover structure movable from closed to open orientation from the ground.

Another object of the invention is to create a cover support structure wherein unlocking the elements and rotating the elements are separate operations.

Another object of the invention is to create a cover support structure wherein elements are unlocked, locked, and rotated individually.

A further object of the invention is to create an openable cover support structure wherein no elements are disposed within the walls of the container it covers.

Yet another object of the invention is accessibility to operational elements of the cover support structure without the operator having to inconveniently bend over or stretch, or climb upward to reach it.

Still another object of the invention is to allow total control of movements of its elements by an operator.

Still another object of the invention is to establish a fixed angle of rotation for all cover support elements.

Yet still another object of the invention is to provide for automatic stoppage of rotation of support 'structure elements at desired points.

Still yet an additional object of the invention is minimization of force necessary to rotate elements of the cover support structure.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a machine for cover support comprising: arcuate spar, spar shaft, and spar shaft lock.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 3 is a view of a spar in operational relationship to a container.

FIG. 3A is a view of the spar and a container side.

FIG. 3B is a view of the spar and a container side.

FIG. 4 is a top view of the spar shaft in operational orientation to a container wall.

FIG. 4A is a front view of the spar shaft in operational orientation to a container wall.

FIG. 48 is a side view of the spar shaft in operational orientation to a container wall.

FIG. 5 is a view of spar shaft to arcuate spar communication means.

FIG. 8 is a side view of a multi-position spar shaft-lock.

FIG. 9 is a front view of the multi-position spar shaft lock.

FIG. 10 is a top view of the multi-position spar shaft lock.

| List of Numbered Elements. | |
|---|---|
| 100 | Cover support means |
| 105 | Trailer |
| 106 | Container |
| 108 | Open top |
| 110 | Cargo |
| 112 | Spar |

| List of Numbered Elements. | |
|---|---|
| 114 | Spar shaft |
| 116 | Spar shaft bayonet |
| 118 | Spar shaft axle |
| 119 | Spar shaft axle bottom |
| 120 | Spar shaft bayonet crook |
| 122 | Spar shaft bayonet angle |
| 124 | Sidewall |
| 125 | Sidewall |
| 126 | Endwall |
| 128 | Floor |
| 130 | Spar bolt hole |
| 132 | Spar shaft bolt hole |
| 134 | Spar shaft bolt |
| 136 | Spar shaft bushing |
| 138 | Spar shaft multi-position lock |
| 140 | Weld |
| 142 | •Shim |
| 144 | Lock pin |
| 146 | Lock pin clip |
| 148 | Spar shaft collar |
| 150 | Spar shaft collar bolt hole |
| 152 | Spar shaft bolt hole |
| 154 | Spar shaft collar bolt |
| 156 | Spar shaft lock housing |
| 160 | Lock pin hole |
| 162 | Opposite lock pin hole |
| 164 | Lock housing top flange |
| 166 | Lock housing back plate |
| 168 | Lock housing bottom flange |
| 170 | Spar shaft seat |
| 174 | Spar shaft collar bolt hole boss |
| 176 | Stud assembly |
| 178 | First stud |
| 180 | Second stud |
| 182 | Wall foot |
| 184 | Wall foot stop |
| 186 | Stud handle |
| 188 | Top flange spar shaft passage |
| 190 | Space |
| 192 | Top flange |
| 194 | Bottom flange |

DETAILED DESCRIPTION OF THE PREFERRED EMBODIMENTS

Detailed descriptions of the preferred embodiment are provided herein. It is to be understood, however, that the pre-sent invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
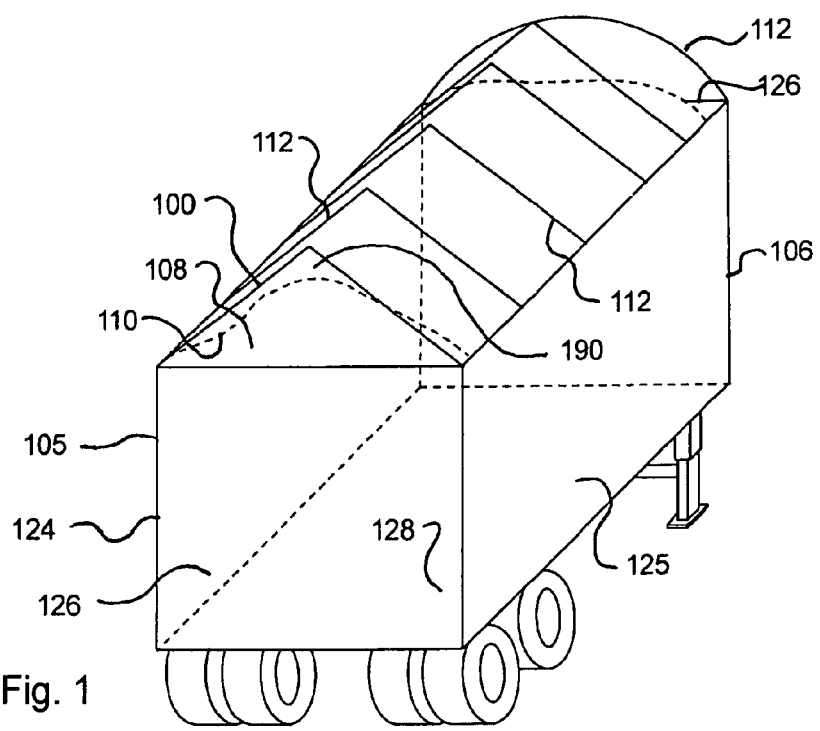
FIG. 1 is an oblique projection view of a container with the instant art deployed.

FIG. 1 shows a common type of cargo transport carrier wherein a sidewall (124) and opposite sidewall (125) adjacent to endwalls (126) extending substantially perpendicularly from a floor (128) comprise a container (106) having an open top (108). A load of cargo (110) may be disposed in the container (106) and the container may comprise a transport trailer (105) railcar, or the like. A cover support means (100) is disposed over the cover.

FIG. 1 additionally shows that the cover support means (100) may comprise a network of spars (112) which communicate with sidewalls (124, 125) thusly spanning the open top (108). Now, one skilled in the art win readily appreciate that the spars (112) may be removed, the container (106) loaded, the spars (112) replaced, and a cover, in example a tarp, placed over the spar (112) network and supported thereby.

The instant art is an advancement in the art of container cover support structure described above.

Figure 2:
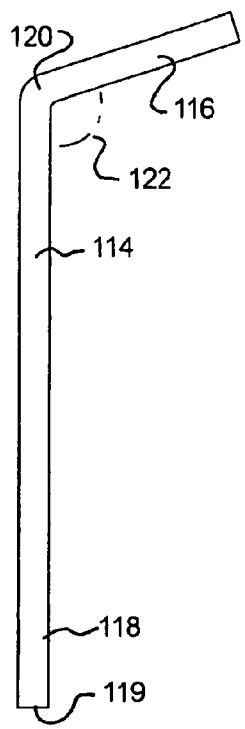
FIG. 2 is right side view of a spar shaft.

FIG. 2 shows a spar shaft (114) having bayonet (116) and an axle portion (118), the axle portion (118) further comprising a bottom (119). The spar shaft (114) also comprises a bayonet crook (120) creating a spar shaft bayonet angle (122).

FIG. 3 shows a spar (112) disposed to span the open top (108). One end of the spar (112) communicates with the opposite sidewall (125). The spar (112) may comprise a wall foot (182) having a wall foot stop (184) to conform to the opposite sidewall (125) thus facilitating said communication. However, as in FIG. 3A, the wall foot (182) need not conform to the opposite sidewall (125), and/or, as in FIG. 3 B, the spar need not comprise a wall foot (182) as in FIG. 3B.

FIGS. 4, 4A, and 4B show that the spar shaft bayonet angle (122) is contrived so that the spar axle (118) may be oriented substantially parallel to the sidewall (124) disposing the spar shaft bayonet (116) to extend in a plane normal to the proximal sidewall towards the opposing sidewall (125). In FIG. 4A, the spar axle (118) is shown in a non-vertical orientation, which allows the spar (112) to be lifted up and away from the open top (108) when the spar shaft (114) is rotated, as will be discussed below. Also, as in FIG. 4B, the spar shaft bayonet crook (120) and the spar shaft bayonet angle (122) are additionally contrived so that when the spar axle (118) is disposed essentially parallel to the sidewall (124), the spar shaft bayonet (116) will extend upwardly from the sidewall (124) at an acute angle relative a line perpendicular to the sidewall (124).

Also seen in FIGS. 4, 4A, and 4B is that the spar shaft bayonet (116) may communicate with the spar (112) by any suitable means commonly known in the art, in a disposition substantially normal the sidewall (124). In example, as in FIG. 5, the spar shaft bayonet (116) may be transfixed by a spar shaft bolt hole (132) and the spar (112) may be transfixed by a spar bolt hole (130). The spar (112) may comprise a hollow portion (113) having a diameter at least the minimum necessary to allow entry of the spar shaft bayonet (116) whereupon the aforementioned holes (130, 132) may be aligned to allow insertion of a spar shaft bolt (134) which will hold the spar shaft bayonet (116) and the spar (112) in substantially fixed relationship according to principles well known in the art.

Figure 6:
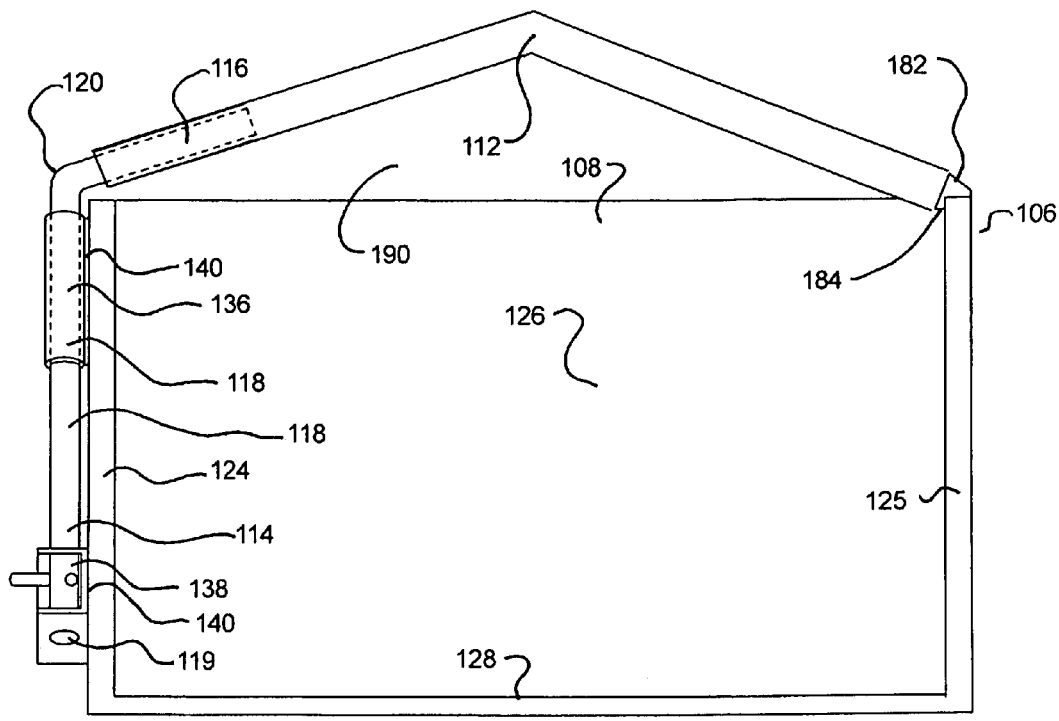
FIG. 6 is a view of the instant an in operational configuration when closed relative a container.

FIG. 6 shows that the spar shaft (114) may communicate with a spar shaft bushing (136). Said bushing (136) comprises a canal having a diameter at least the minimum necessary to allow passage therethrough of the spar shaft (114) and rotational movement of said spar shaft (114) therein. Also shown is a spar shaft multi-position lock (138) communicating with the spar shaft (114). Also noted is that the spar shaft bushing (136) is disposed proximal the spar shaft bayonet crook (120) and distal the spar axle bottom end (119) while the spar shaft multi-position lock (138) is disposed proximal the spar axle bottom end (119) and distal the spar shaft bayonet crook (120).

FIG. 6 additionally shows that the spar shaft bushing (136) and the spar shaft multi-position lock (138) may be attached to the sidewall (124) by many means known in the art, in example by welds (140). Thus, those skilled in the art will readily appreciate that that the spar shaft (114) may be fixed in communication with the sidewall (124) in the previously described non-vertical orientation. Also seen is that the spar (112) extends from the spar shaft bayonet (116) to the opposite sidewall (125) to span the open top (108).

Figure 7:
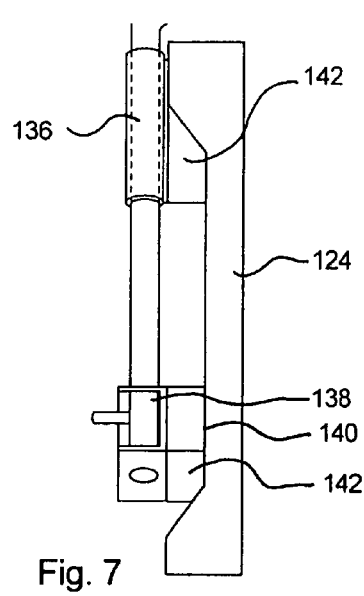
FIG. 7 is a side view of instant' art/container communication means.

FIG. 7 shows that the sidewall (124) may not always have substantially planar surfaces. In such instances, shims (142) may be used to affect required communication of the spar shaft bushing (136) and the spar shaft multi-position lock (138) with Said sidewall (124), by any suitable means, in example, welds (140).

Figure 7A:
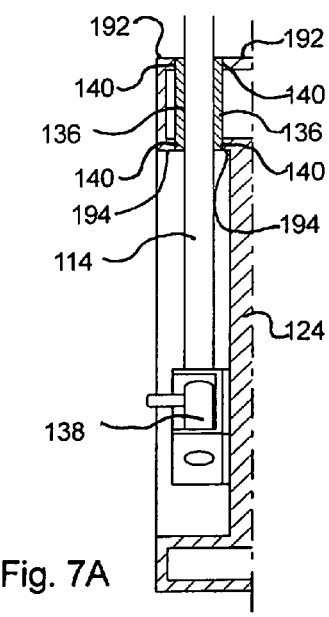
FIG. 7A is a side view of instant art/container communication means.

A container body construction common in the art comprises a sidewall (124) having a top flange (192) and/or a bottom flange (194) extending substantially normal to the top of the sidewall (124). In example, as shown in FIG. 7A wherein the sidewall comprises or depends from a beam, channel metal, angle metal or other similar device. In such instance, the spar shaft bushing (136) may be positioned in holes in the top flange (192) and/or bottom flange (194) and secured therein by means well known in the art, in example welds (140). Thus, the spar shaft (114) may pass through the bushing (136) and through the top flange (192) and/or the bottom flange (194).

FIGS. 8, 9, and 10 show detail of the spar shaft multi-position lock (138) when the spar (112) is oriented in a closed, covering position. The spar shaft multi-position lock (138) comprises a housing (156) having a substantially planar back plate (166) with a substantially planar housing top flange (164) and a substantially planar housing bottom flange (168) extending essentially normally to the back plate (166) from opposite sides of said back plate (166) thereby resembling an English alphabet letter "U" shape.

The top flange (164) comprises a top flange spar shaft passage (188) having a diameter at least the minimum necessary to allow passage of the spar shaft (114) therethrough and rotational movement of the spar shaft (114) therein. The bottom flange (168) comprises a bottom flange spar shaft seat (170) having a diameter at least the minimum necessary to allow passage of the spar shaft (114) thereinto and rotational movement of the spar shaft (114) therein. The top flange spar shaft passage (188) and the bottom flange spar shaft seat (170) may be oriented substantially coaxially or in any other disposition one relative the other that allows the spar shaft (114) to pass through both simultaneously.

FIGS. 8, 9, and 10 also show sets of lock pin holes (160) positioned in the top flange (164) and bottom flange (168) with at least one said lock pin hole (160) set disposed in the top flange (164) and bottom flange (168) to one side of the top flange spar shaft passage (188) and bottom flange spar shaft seat (170). Said lock pin holes (160) are be substantially coaxial to allow passage of a lock pin (144) therethrough.

Also, at least one set of opposite lock pin holes (162) is disposed in the top flange (164) and bottom flange (168) on the opposite side of the top flange spar shaft passage (188) and the bottom flange (168) spar shaft seat (170) from the lock pin holes (160), Said opposite lockpin holes (162) are substantially coaxial to allow passage of the lock pin (144) therethrough.

FIGS. 8, 9, and 10 additionally show the lock pin (144) extending through the lock pin holes (160). Also seen is a lock pin clip (146) communicating with opposite ends of the lock pin (144). The lock pin clip (146) is curved to allow said communication regardless of the intervening spar shaft multi-position lock (138) structure. The lock clip (146) is sufficiently flexible and/or resilient to allow it to be distended and thus disengaged from one end of the lock pin (144). However, said resiliency and/or flexibility is contrived so that forces encountered during operation of the instant art will not disengage said lock pin clip (146).

Now, one skilled in the art will readily appreciate that the lock pin clip (146) may be disengaged from one end of the lock pin (144) allowing said lock pin (144) to be extracted from the set of lock pin holes (160). The lock pin (144) may then be inserted in another set of opposite lock pin holes (162) and, the lock pin clip (146) re-engaged.

FIGS. 8, 9, and 10 further depict a spar shaft collar (148) having a longitudinal bore. Said bore comprises a diameter at least the minimum necessary to allow passage of the spar shaft (114) therethrough. The spar shaft collar (148) is transfixed by a spar shaft collar bolt hole (150) oriented substantially normal to the spar shaft collar bore. Also shown is that the spar shaft axle (118) proximal the spar shaft axle bottom end (119) comprises a spar shaft bolt hole (152) traversing said spar shaft axle (118) substantially normal to the spar shaft axle (118).

Now, one skilled in the art will readily appreciate that the spar shaft (114) may be passed through the spar shaft collar (148) whereupon the spar shaft collar bolt hole (150) and the spar shaft bolt hole (152) may be aligned allowing passage therethrough of a spar shaft collar bolt (154). Said bolt (154) will hold the spar shaft collar (148) and the spar shaft (114) in fixed orientation according to well known principles.

Figure 13:
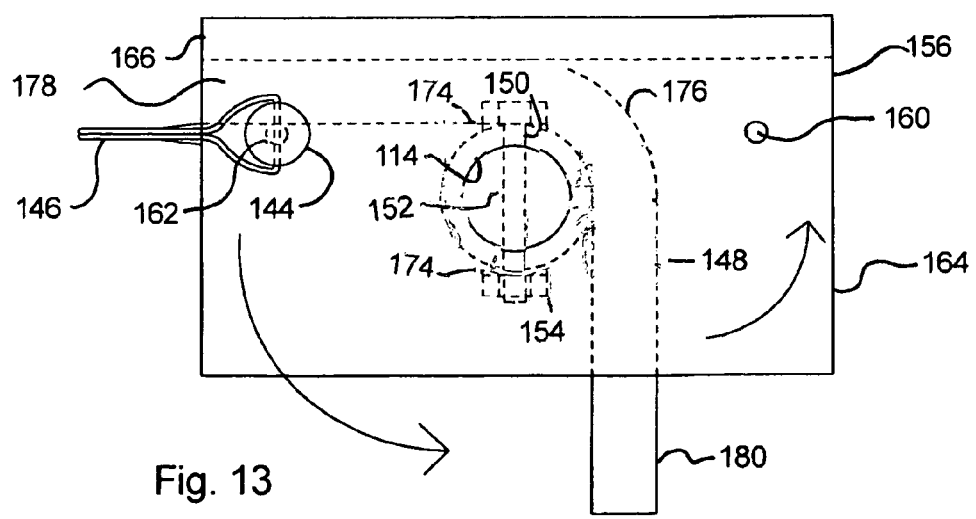
FIG. 13 is a top view of the multi-position spar shaft lock.

FIGS. 10 and 13 show that the-spar shaft collar bolt hole (150) may comprise one or more bosses (174) to re-enforce said hole (150) and/or to provide enlarged engagement surfaces for elements of the spar shaft collar bolt (154).

FIGS. 8, 9, and 10 also show a stud assembly (176) comprising a first stud (178) and a second stud (180), each essentially normal the other. Also shown is that said stud assembly (176) is attached to the stud shaft collar (148), by any means well known in the art, in example welds (140), in essentially fixed relationship. Additionally noted, is that the second stud (180) is disposed essentially parallel to the lock switch housing back plate (166), and the first stud (178) is oriented substantially normal said lock switch housing back plate (166). Also, the second stud (180) essentially abuts the lock switch housing back plate (166) and the lock pin (144). Therefore, the stud assembly (176) and the spar shaft (114) are essentially immovably locked. Thus, any other structure fixedly attached to the spar shaft (114) may also be immovably locked.

Now, one skilled in the art will readily appreciate that the lock pin (144) may be disengaged from the lock pin holes (160) whereupon appropriate force may be applied to the first stud (178) causing torque, in the direction—of arrows, to be applied to the spar shaft (114) by means of the aforementioned fixed attachments of the stud assembly (176), spar shaft collar (148), and spar shaft (114). Thusly, the spar shaft (114) may be rotated to change the orientation of the spars (112) to be directed externally of the sidewalls (124) or (125) in direction of arrows in order to rotate the spar (112).

Figure 11:
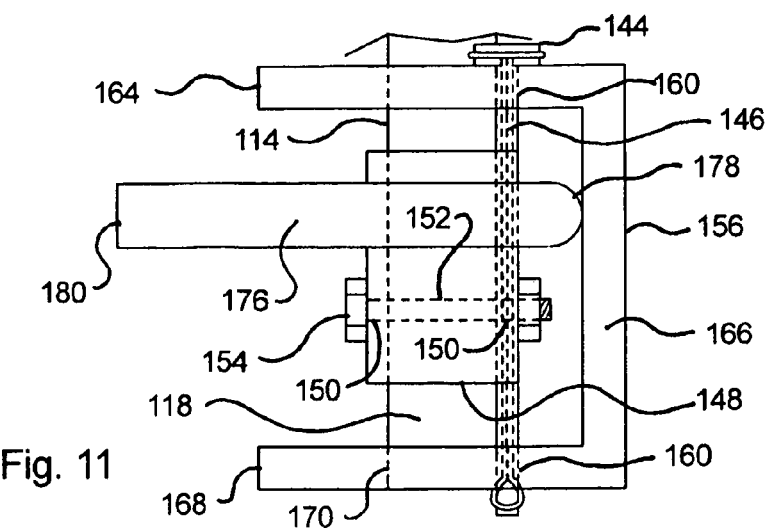
FIG. 11 is a side view of the multi-position spar shaft lock.
Figure 12:
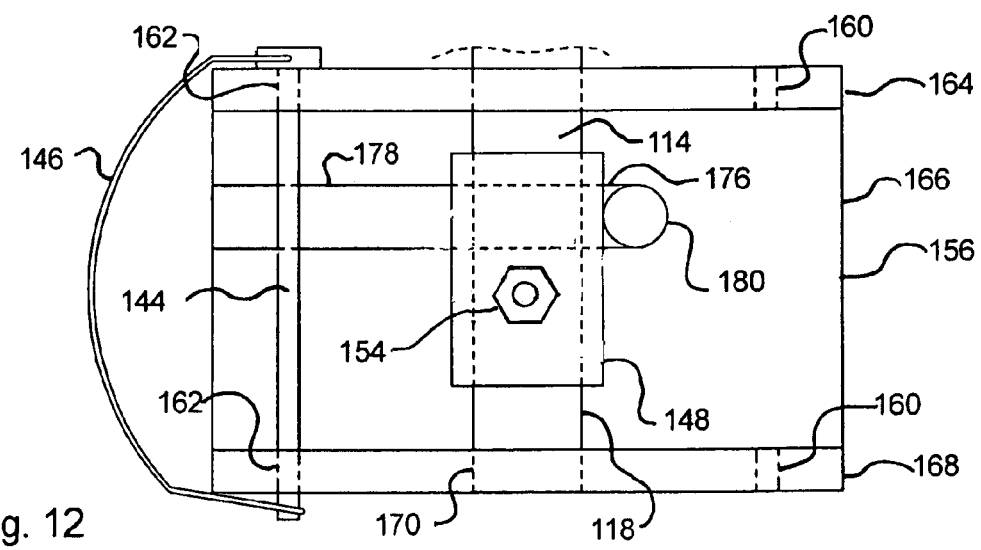
FIG. 12 is a front view of the multi-position spar shaft lock.

FIGS. 11, 12, and 13 show that said spar shaft (114) may be rotated, in direction of arrows in FIG. 10, until the first stud (178) reaches disposition essentially parallel, and/or abutting, the look housing back plate (166) whereupon the lock pin (144) may be inserted through the opposite set of lock pin holes (162) and the lock pin clip (146) re-engaged: Thus, the first stud (178), now essentially abutting the back plate (166) and the lock pin (144), will be held immovably while the second stud (180) will have moved to essentially normal said back plate (166).

Now it may be understood that the aforedescribed process may be executed and reversed as often as required, rotating, the spar shaft (114) from one position to another and vice versa. Further understood is that the available degree of rotation of the spar shaft (114) from the one locked position to the other is essentially fixed, said angle of rotation being determined by the angle of the first stud (178) relative the second stud (180). Further understood is that when either the first stud (178) or second stud (180) is essentially parallel to or abutting the spar shaft multi-position lock housing back plate (166) sufficiently for the lock pin (144) to be engaged as previously described, the spar shaft (114) is in proper disposition. Thus, said disposition occurs automatically by locking the spar shaft (114).

Attending again to FIG. 6, one notes the spar (112) fixedly attached to the spar shaft bayonet (116) as previously described. Additionally seen is that the spar shaft (114) may be fixedly attached, so as to be rotatable, as previously described,' and, according to FIGS. 4, 4A, and 4B, so that the spar shaft bayonet (116) extends in a plane that is essentially normal the sidewall (124) and opposite sidewall (125). Also noted is that the shaft (112) spans the open top (108) while being supported at its extremes.

One end is-supported by the spar shaft bayonet (116) and the opposite end is supported by the opposite sidewall (125). However, it may be understood that the spar (112) need not extend sufficiently to contact or be supported by the opposite sidewall (125). The spar (112), the spar shaft (114) and 'its attachment to the sidewall (124), plus the attachment of the spar (112) to the spar shaft bayonet (116), and the substance of aforementioned elements may be sufficiently substantial to acceptably function and support without being buttressed by the opposite sidewall (125).

Now, one skilled in the art will readily appreciate that a plurality of spar shafts (114) may be disposed in communication with the sidewall so that a network of spars (112), as seen in FIG. 1, may be positioned in such a way that the spars (112) comprise a framework capable of supporting a cover. Also, it may be understood that the spar (112) may be configured in various shapes, in example forms in which any three points comprising the axis of said spar (112) do not comprise a straight line.

Figure 15:
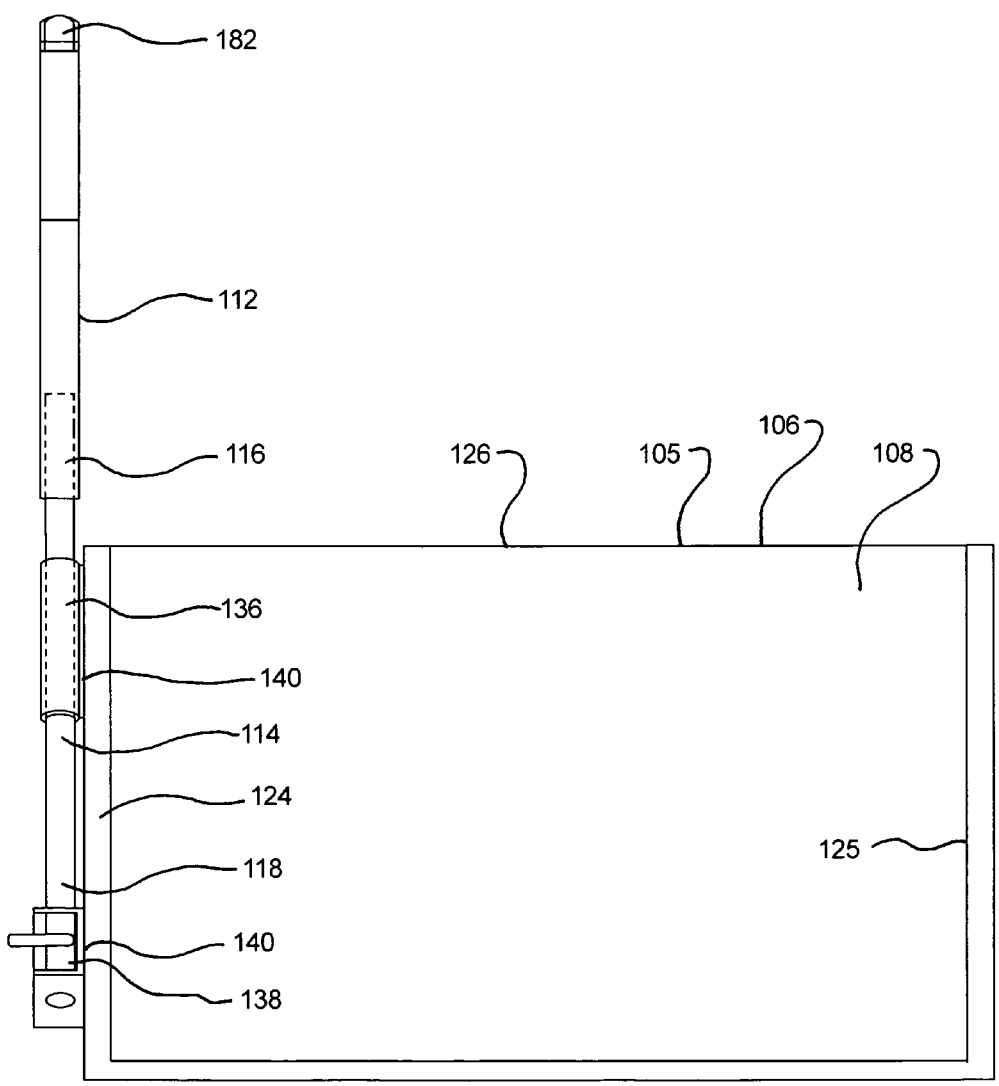
FIG. 15 is a view of the instant art in-operational configuration when open relative a container.

FIG. 15 shows' the elements as disposed in FIG. 6 but with the spar shaft (114) rotated as previously described. Also as shown, the previously described angle of rotation is contrived so that subsequent to said rotation, the spar shaft (114) and the fixedly attached spar (112) may be essentially co-planar and/or parallel to the sidewall (124). It may also be easily understood that the spar shaft (114) may be rotated as previously described to reposition the attached spar (112) to the orientation displayed in FIG. 6.

Now, it may be understood that the plurality of spars (112) positioned as in FIGS. 1, 3, and 6 create a space (190) between themselves and the container sidewalls (124, 125) and end walls (126) allowing a load (110) to be heaped up higher than said container sidewalls (124) and end walls (126). In addition, the spar shaft bayonet crook (120) orients the spar shaft (114) as seen in FIGS. 4, 4A, and 48, to dispose the spar shaft bayonet (116) essentially normal the sidewall (124). When the spar shaft (114) is rotated from its position seen in FIG. 6 to the orientation seen in FIG. 15, the spar (112) end opposite the end attached to the spar shaft bayonet (116) will travel in an upward curve from the opposite sidewall (125) to its final position seen in FIG. 15.

One skilled in the art will therefore readily appreciate that when the spar shaft (114) is rotated, the shaft (112) will not be obstructed by a cargo (110) heaped up above the container walls as seen in FIG. 1. Additionally understood is that a network of arcuate spars (112) as in FIG. 1, may support over the container top opening (108) a cover. The cover may be removed and the spars (112) repositioned, as demonstrated by FIG. 6 and FIG. 15, thereby exposing the open top (108) to allow unobstructed unloading and loading of the container (106). The spars (112) may then be repositioned as seen in FIG. 6 and as in FIG. 1, and a cover placed over said spars (112).

Figure 14:
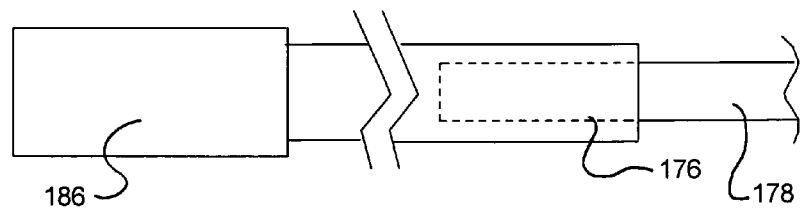
FIG. 14 is a view of a stud handle.

FIG. 14 shows that a handle may be contrived to communicate with either the first stud (178) or the second stud (180) of the stud assembly (176) in order to provide leverage to facilitate rotation of the spar shaft (114).

While the invention has been described in connection with a preferred embodiment, it is not intended to limit the scope of the invention to the particular form set forth, but on the contrary, it is intended to cover such alternatives, modifications; and equivalents as may be included within the spirit and scope of the invention as defined by the appended claims.

What is claimed is:

1. A device capable of supporting a cover over a top of a cargo carrier having sidewalls extending upwardly relative to a floor, said device comprising:
   a spar;
   a rotatable spar shaft, and
   a spar shaft rotation lock connected to one of sidewalls extending above a cargo carrier, with the shaft rotation lock located above a floor of the cargo carrier,
   wherein the spar shaft rotation lock locks the spar shaft in a fixed position in a first configuration, said spar shaft rotation lock being releasable in a released configuration and re-engageable in a second locked configuration;
   with said spar shaft rotated through the released configuration between the first and second locked configurations;
   wherein the spar shaft is limited in rotation by first and second studs, said first stud locked in a first position when locking the spar shaft in the first configuration and said second stud locked in a second position when locking the spar shaft in the second configuration.

2. A device as in claim 1, wherein the spar shaft comprises an end crook from which said spar extends.

3. A device as in claim 1, wherein the cover covers the cargo carrier comprising a first sidewall and a second sidewall of the sidewalls and wherein the spar extends from the first sidewall of the container toward the second sidewall of the container in a first configuration.

4. A device as in claim 1, wherein the spar comprises ends and an intermediate portion, said intermediate portion comprising a point not lying in a line passing through the ends.

5. A device as in claim 1, wherein the spar shaft rotation lock is located on an exterior surface of a sidewall.

6. The device of claim 1, wherein the spar shaft is provided in a non-vertical orientation and rotation moves a spar end upwardly and outwardly relative to one of the first and second sidewalls as the carrier.

7. The device of claim 1, wherein the spar shaft raises an end of the spar between the first and second locked configurations.

8. The device of claim 1, further comprising a housing connected to an exterior surface of one of the sidewalls, wherein said first and second studs contact the housing in the first and second positions.

9. The device of claim 8, wherein the first and second studs are joined at an angle limiting the rotation of the spar shaft accordingly relative to the housing.

10. A device capable of supporting a cover, said device comprising:
    a rotatable spar shaft;
    a spar that is integral with said spar shaft; and
    a spar shaft rotation device located above a floor of cargo carrier;
    the spar extending from the spar shaft in such a way as to be oriented to support a cover over the cargo carrier having opposing sidewalls above the floor;
    the spar shaft communicating with the spar shaft rotation device, said rotation device having a first configuration locating the spar shaft in a first position over the floor between the sidewalls,
    said shaft rotation device rotatable to a second position orienting the spar outside of the sidewalls.

11. The device of claim 10, wherein rotation of the spar shaft from the first to the second position lifts and rotates the spar.

12. A device capable of supporting a cover, said cover capable of covering a container comprising a first sidewall and a second sidewall above a floor, said device comprising:
    a spar extending from a first sidewall of a container toward a second sidewall of the container in a first position, said spar comprising ends, and an intermediate portion, said intermediate portion comprising a point not lying in a line passing through the ends; and
    a rotatable spar shaft oriented in a non-vertical orientation from which said spar extends and wherein an end of the spar distal from the spar shaft circumscribes a curve having an apex exterior to the container when the spar shaft is rotated to a second position with the end of the spar being at a higher elevation in the second configuration than in the first configuration;
    a spar shaft rotation lock locking the spar shaft in the first fixed position in a first locked configuration;
    a second locked configuration locking the end of the spar external to the container.

* * * * *